Jan. 26, 1954

C. A. McCARTY 2,667,045

COOLING SYSTEM FOR AUTOMOTIVE VEHICLES

Filed July 28, 1951

INVENTOR.
Chester Albert McCarty
BY
Leslie M. Hansen

HIS ATTORNEY.

Patented Jan. 26, 1954

2,667,045

UNITED STATES PATENT OFFICE 2,667,045

COOLING SYSTEM FOR AUTOMOTIVE VEHICLES

Chester A. McCarty, Palm Springs, Calif.

Application July 28, 1951, Serial No. 239,099

3 Claims. (Cl. 62—125)

This invention relates broadly to cooling systems for automotive vehicles and more particularly to certain novel improvements therein for conditioning the air in the passenger compartment of such vehicle in a simple, efficient and effective manner.

Most passenger vehicles of present design are provided with a conventional heater of the type in which fluid circulated through the motor block and automobile radiator creates heat suitable for raising the temperature within the passenger compartment or cab of a vehicle. In the present application the heater unit is utilized as an air conditioning unit for lowering the temperature within the vehicle cab. While utilizing a single unit for the dual purpose of heating or cooling is not basically new, this invention contemplates the provision of a cooling system capable of such application without subjecting people within the cab of the vehicle to the dangers of leaky or faulty coolant lines.

With the foregoing in mind it is an object of this invention to provide in a cooling system for vehicles a simple yet effective means of isolating refrigerant gases or fluids from secondary fluids for conducting temperature changes to the cab of the vehicle.

Another object is to provide a cooling system in which a maximum efficiency in temperature control is obtained with a minimum of initial energy on the part of a self propelled unit such as an automotive vehicle.

Yet another object is to provide a compact evaporator coil and temperature transmitting unit for a cooling system employed in conjunction with a self contained source of power such as the motor of an automotive vehicle.

It is still another object of this invention to provide in conjunction with the evaporator coil of a refrigeration unit a secondary coil so related to the evaporator coil as to transmit the cooling effect thereof into a separate and isolated conduit for use in an air conditioning system.

A further object is to provide a jacketed evaporator coil for the purpose of conducting a secondary but isolated coolant from exteriorly the evaporator coil to a heat exchange coil or radiator in a separate zone remote from that in which the refrigerating system is located.

These and other objects and advantages of the present invention will become apparent in the following description read in the light of the drawings in which.

Figure 1:
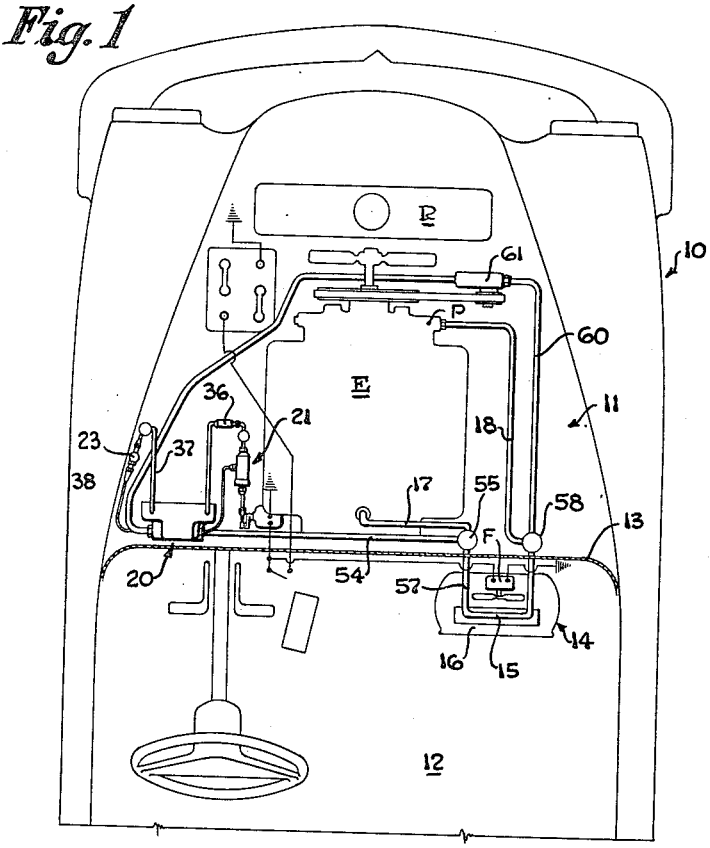
Fig. 1 is a fragmentary plan of an automotive vehicle having a cooling system embodying the present invention.

Referring to the drawings, 10 indicates a conventional automotive vehicle having a compartment 11 for an engine E and a passenger compartment or cab 12. These compartments 11 and 12 are divided from each other by a partition 13 generally referred to as the dash board upon which the instrument panel of the vehicle is disposed. This partition 13 is usually insulated to prevent heat and fumes created in the engine compartment from entering the cab of the vehicle to afford comfort and safety for passengers riding in the cab.

For purposes of illustration I have shown the vehicle 10 as being provided with a heater unit 14 of the type using the water cooling system of the vehicle engine E as a mode of heating the interior of the cab 12. A heater unit of this type embodies a fin type heat exchange coil 15 within a housing 16 and connected by conduits 17 and 18 to the water circulating system of the vehicle engine. The conduit 17 communicates the coil 15 with the hot side of the motor block of the engine E while the conduit 18 communicates the opposite side of the coil 15 with a water pump P. The water in the cooling system of the engine E is forced by pump P through a conventional automobile radiator R for cooling the water prior to its return to the motor block. The heater unit 14 further includes a small fan F behind the coil 15 and within the housing 16 for circulating air through the coil 15. The air passing through the coil 15 can be deflected as desired to pass into and around inside the cab 12 for changing the temperature therein according to the desire of the passengers.

The present invention is easily applied to the heater unit 14 although a separate unit of like character may well be employed for the purpose of changing the air temperature within the cab 12. Consequently, for purposes of the present disclosure the unit 14 just described will hereinafter be referred to as an air conditioner or air conditioning unit for the interior of the cab or passenger compartment 12.

The present invention is embodied in a unit 20 constructed to employ the basic principles of refrigeration. However, this unit 20 includes certain novel structural features and arrangement of parts conducive to compactness, low voltage operation as well as safe and economical performance in the utilization of the basic principles of refrigeration.

Figure 3:
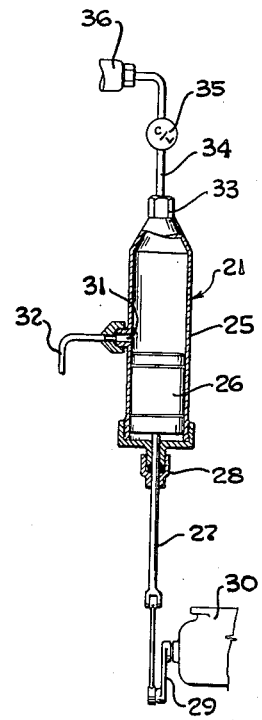
Fig. 3 is a detail section of a pump or compressor embodied in the cooling system shown in Fig. 1.

In general, the unit 20 embodying the present invention includes a compressor 21, a condenser 22, an expansion device 23 and an evaporator 24 communicated with each other in a closed system of refrigerating fluid for accomplishing the usual result. The expansion device may be similar to the expansion valve described and disclosed in U. S. Patent No. 2,274,127. The compressor 21 as best seen in Fig. 3, comprises a cylinder 25 having a piston 26 disposed therein on a rod 27 extending through a packing gland 28 for connection to a crank 29 exteriorly of the cylinder. In the present case, the refrigerating unit is to be operated with a minimum of pressure within its lines and consequently the compressor here need not have greater than a 5 to 8 pound capacity. The crank 29 is therefore driven by a small six volt motor 30 or may be belt driven direct from the crankshaft of the engine E if desired.

The cylinder 25 has a port 41 midway its ends communicating via a tube 32 with the discharge side of the evaporator 24. The cylinder 25 has an axial discharge outlet 33 connected by a tube 34 to the input side of the condenser 21. This tube 34 has a check valve 35 disposed in it to check back flow of refrigerant gas into the compressor cylinder after the gas has been forced therefrom by the piston 26. Also disposed in the conduit provided by the tube 34 is a dryer 36 which functions to further assist in taking the water out of the compressed fluid refrigerant prior to its admission into the condenser.

The discharge side of the condenser 21 is communicated via a tube 37 with the intake side of the expansion device 23. Another tube 39 leads from the expansion device 23 into the intake side of the evaporator 24.

Figure 2:
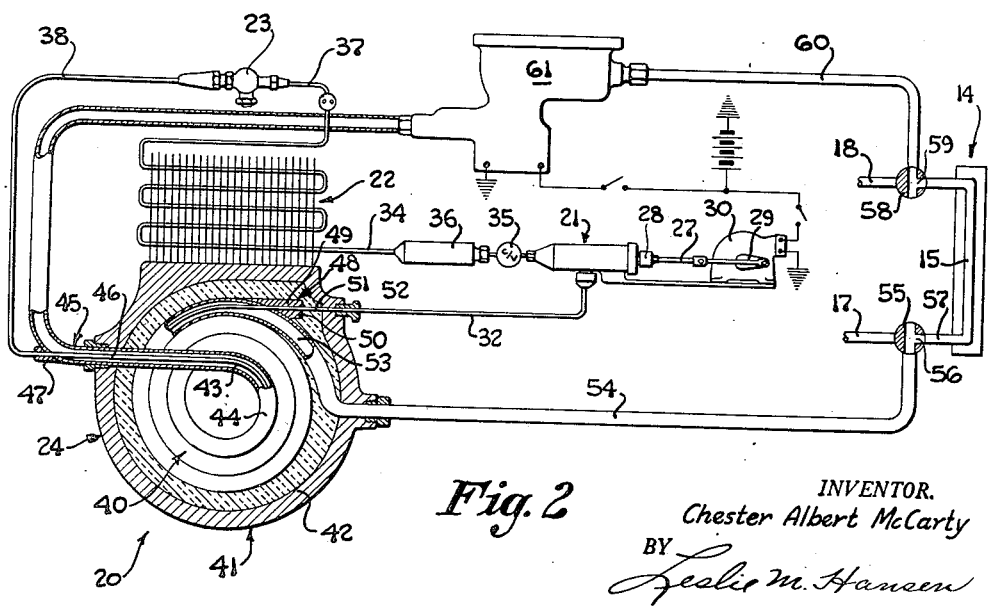
Fig. 2 is a schematic diagram of the cooling system shown in Fig. 1, parts thereof being broken away for the purpose of illustrating the present invention.

In accordance with the present invention the evaporator 24 is of a compact construction suitable for installation in a minimum space within the engine compartment 11 of the vehicle. As best seen in Fig. 2 the evaporator 24 is in the form of a spiral coil 40 disposed within a housing 41 which need not be more than six inches in diameter. The intake side of the evaporator is disposed centermost in the gradually enlarging spiral coil 40, the outer convolutions of which are adequately spaced from the periphery of the housing 41 to receive thermal insulation material 42 suitable to prevent absorption of motor heat by the evaporator.

It is in conjunction with this evaporator coil 40 that the present invention is involved. In this connection it will be noted that all of the tubes or conduits through which refrigerant flows are disposed in a closed refrigerating system which is wholly contained within the engine compartment 11 of the vehicle 10. Consequently none of the refrigerating tubes are directly connected with the air conditioning unit 14 or its coil 15 disposed within the cab of the vehicle.

In accordance with the present invention a secondary closed system of thermal conductive fluid is provided. In this connection the coil 40 of the evaporator preferably comprises a tube within a tube whereby to obtain heat transmitting contact between the fluids of the refrigerating and secondary system while keeping these fluids separated from each other.

The inner tube 43 preferably has about a ⅛ inch inner diameter while the outer tube 44 has approximately a ½ inch diameter passage. The inner tube 43 is placed within the outer tube 44 when they are straight and then they are both wound into the spiral coil shape shown in a single operation. The inner tube 43 forms the coil of the evaporator and contains the usual refrigerant fluid and/or gas employed. The outer tube 44 constitutes a jacket for conveying a secondary fluid, such as water, for transmitting cold temperature to the cooling or air conditioning unit within the cab of the vehicle. Therefore, the intake side of the coil 40 requires a special fitting 45 in the form of an elbow having the intake side 46 of the evaporator 24 extending straight through the curved portion 47 of the elbow. The opposite or discharge side of the coil 40 also has a special fitting 48 of like character except that it is in the form of a Y having one leg 49 in the form of a plug 50 tangent to the outermost convolution of the coil 40. The discharge end 51 of the evaporator tube 43 extends straight through the plug 50 and is coupled as at 52 to the tube 32 connected to the compressor 21. The other leg 53 of the fitting 48 extends out of the housing 41 in the form of a tube 54 communicating directly with the intake or hot side of the coil 15 of the air conditioning unit 14. The connection is made through a two-way valve 55 having a right angled port 56 adapted to communicate either the hot water tube 17 or the cold water tube 57 to the air conditioning coil 15. The opposite or discharge side of the coil 15 likewise passes through a two-way valve 58 having a right angled port 59 adapted to communicate the coil 15 with either the hot water return tube 18 or with a tube 60 for returning cold water to the intake elbow 45 for the outer tube 44 of the evaporator coil 40.

In connection with the foregoing it will be noted that a pump 61 disposed in the cold water return tube 60 functions to circulate the fluid within tube 60 back to the intake elbow 45 of the evaporator. The pump 61 is of a simple type such as is employed as a fuel pump operated by a stroke mechanism in a manner well known in the art. It should be apparent, however, that the pump 61 can be driven through pulley connection with the fan belt of the engine E or may be actuated by an independent motor if desired.

The fluid contained within the outer jacket 44 of the evaporator 24 and its associated tubes 57 and 60 may be clear water, an anti freeze solution, or water mixed with an anti freeze solution, dependent upon the temperature attained within the evaporator 24.

Consequently, since the fluid within the tubes 57, 60 and coil jacket 44 of the air conditioning unit becomes intermixed with the fluid used in the normal cooling system of the engine E, it will be noted that no harm will be done by running either of these two fluids through a common air conditioning coil such as the radiator coil 15 in the housing 16 within the cab of the vehicle.

In addition to the foregoing it will be noted that the danger of leakage of refrigerant gas or fluid into the passenger compartment 12 of the vehicle is minimized. Moreover, by providing a tube within a tube, such as the inner and outer tubes 43 and 44, respectively, within the insulator housing 41, a maximum efficiency of thermal insulation and cooling effect is attained within a minimum of space.

While I have shown and described one specific form of carrying out the principle of my invention it will be apparent that variations, modifications and alterations in structure and arrangement can be made without departure from the spirit of the invention. I therefore desire to avail myself of all variations, modifications and alterations as fairly come within the purview of the appended claims.

What I claim as new and desire to protect by Letters Patent is:

1. The combination with the evaporator of a closed refrigerating system and a closed secondary fluid conducting system containing a secondary fluid transmissible to a heat exchange coil, of means for effecting transfer of the cooling effect from said evaporator to said secondary fluid, comprising a drum-like housing, a pair of coaxial tubes spirally coiled within said housing from an inner convolute substantially centrally of said housing to an outer convolute spaced inwardly from the inner side of the peripheral wall of said drum-like housing, the inner one of said pair of coaxial tubes constituting the evaporator coil of said closed refrigerating system, and the outer tube of said pair of coaxial tubes communicating with said secondary fluid system for transferring the cooling effect of said evaporator coil to said secondary fluid system.

2. The combination with a closed refrigerating system and a closed secondary fluid conducting system containing a secondary fluid transmissible to a heat exchange coil, of an evaporator for said refrigerating system and means for effecting transfer of the cooling effect from said evaporator to said secondary fluid, comprising a drum-like housing, a pair of coaxial tubes spirally coiled within said housing from an inner convolute substantially centrally of said housing to an outer convolute spaced inwardly from the inner side of the peripheral wall of said drum-like housing, the inner one of said pair of coaxial tubes being interposed in said closed refrigerating system and constituting the evaporator thereof, the outer tube of said pair of coaxial tubes communicating with said secondary fluid system for transferring the cooling effect of said inner one of said coaxial tubes to said secondary fluid as it circulates through the outer one of said coaxial tubes.

3. The combination with a closed refrigerating system and a closed secondary fluid conducting system containing a secondary fluid transmissible to a heat exchange coil, of an evaporator for said closed refrigerating system and means for effecting transfer of the cooling effect from said evaporator to said secondary fluid, comprising a drum-like housing having insulation material therein, a pair of coaxial tubes spirally coiled within said housing from an inner convolute substantially centrally of said housing to an outer convolute spaced inwardly from the inner side of the peripheral wall of said drum-like housing, an intake fitting on one wall of said housing including an outside passage and an inside passage merging with each other for isolated passage through said one wall of said housing, the inner one of said pair of coaxial tubes constituting the evaporator coil of said closed refrigerating system and having its inside convolute communicating therewith through the inner passage of said intake fitting, the outer tube of said pair of coaxial tubes communicating with said secondary fluid system and having its inner convolute communicating with the outside passage of said intake fitting for transferring the cooling effect of said evaporator coil to said secondary fluid system from the inner convolute of said coaxial tubes to the outer convolute thereof.

CHESTER A. McCARTY.

References Cited in the file of this patent

UNITED STATES PATENTS

| Number | Name | Date |
|---|---|---|
| 1,928,212 | Salto | Sept. 26, 1933 |
| 1,985,641 | Krapf et al. | Dec. 25, 1934 |
| 2,211,527 | Straub | Aug. 13, 1940 |
| 2,248,756 | Henny | July 8, 1941 |
| 2,481,469 | Brown | Sept. 6, 1949 |